(12) United States Patent
Grieve (10) Patent No.: US 9,480,941 B2
(45) Date of Patent: Nov. 1, 2016

(54) APPARATUS AND METHOD FOR CLEANING AIR FILTERS

(71) Applicant: Dennis Grieve, Star, ID (US)

(72) Inventor: Dennis Grieve, Star, ID (US)

(73) Assignee: Gita Green, Inc., Spencer, IA (US)

( * ) Notice: Subject to any disclaimer, the term of this patent is extended or adjusted under 35 U.S.C. 154(b) by 451 days.

(21) Appl. No.: 14/136,417

(22) Filed: Dec. 20, 2013

(65) Prior Publication Data

US 2015/0174516 A1  Jun. 25, 2015

Related U.S. Application Data (60) Division of application No. 13/602,424, filed on Sep. 4, 2012, now Pat. No. 8,668,782, which is a continuation of application No. PCT/US2011/047180, filed on Aug. 10, 2011.

(51) Int. Cl.
   *B01D 41/04* (2006.01)
   *B08B 5/02* (2006.01)

(52) U.S. Cl.
   CPC ..................................... *B01D 41/04* (2013.01)

(58) Field of Classification Search
   CPC ................................ B01D 41/04; B08B 5/02
   See application file for complete search history.

(56) References Cited

U.S. PATENT DOCUMENTS

| | | | |
|---|---|---|---|
| 2,226,870 A | 12/1940 | McDevitt | |
| 2,432,290 A | 12/1947 | Davis | |
| 2,716,238 A | 8/1955 | Hall, Sr. | |
| 3,174,490 A | 3/1965 | Flarsheim | |
| 3,442,276 A | 5/1969 | Hanish et al. | |
| 3,604,437 A | 9/1971 | Tappan, Jr. | |
| 3,606,897 A | 9/1971 | Tobin | |
| 3,688,780 A | 9/1972 | Everroad | |
| 3,958,296 A | 5/1976 | Fell | |
| 4,299,245 A | 11/1981 | Clapper | |
| 4,377,401 A | 3/1983 | Laughlin | |
| 4,802,983 A | 2/1989 | Howeth | |
| 4,810,270 A | 3/1989 | Terry et al. | |
| 4,826,512 A | 5/1989 | Fuller | |
| 4,935,126 A | 6/1990 | Drori | |
| 5,078,763 A | 1/1992 | Blount-Gillette | |
| 5,135,580 A | 8/1992 | Cantrell et al. | |
| 5,182,832 A | 2/1993 | McMahon | |
| 5,228,993 A | 7/1993 | Drori | |
| 5,263,503 A | 11/1993 | St. Jean | |
| 5,565,012 A | 10/1996 | Buodd | |

(Continued)

FOREIGN PATENT DOCUMENTS

| | | |
|---|---|---|
| DE | 3920097 | 2/1990 |
| EP | 2027905 | 2/2009 |

*Primary Examiner* — Michael Barr
*Assistant Examiner* — Benjamin L Osterhout
(74) *Attorney, Agent, or Firm* — James Ray & Associates Intellectual Property, LLC (57) ABSTRACT

An apparatus for cleaning air filters utilizes a pressurized fluid flow, preferably air, to rotate a set of air spraying jets inside a hollow interior of a filter in order to remove particles from the filter. To ensure proper positioning of the jets in relation to the filter the present invention uses a set of plates with slots and pins, wherein the pins secure the apparatus on one end of the filter. The set of plates also at least partially blocks the flow of air out of the ends to more efficiently direct the flow of air from the jets to the filter. The jets then may be moved reciprocally along the length of the filter for cleaning purposes.

21 Claims, 5 Drawing Sheets

(56) References Cited

U.S. PATENT DOCUMENTS

| | | |
|---|---|---|
| 5,584,900 A | 12/1996 | Zaiser et al. |
| 6,280,491 B1 | 8/2001 | Oke |
| 6,283,305 B1 | 9/2001 | Maeda et al. |
| 6,368,390 B1 | 4/2002 | Bitner et al. |
| 6,588,057 B2 | 7/2003 | McMahon |
| 7,815,701 B2 | 10/2010 | Grieve |

APPARATUS AND METHOD FOR CLEANING AIR FILTERS

CROSS-REFERENCE TO RELATED APPLICATIONS

This application is a divisional of a prior non provisional patent application Ser. No. 13/602,424, filed Sep. 4, 2012. This application is related to and claims priority from an International Application Serial No. PCT/US2011/047180 filed on Aug. 10, 2011. This application is closely related to U.S. patent application Ser. No. 11/978,304 filed on Oct. 29, 2007, now U.S. Pat. No. 7,815,701 issued to Applicant of this application on Oct. 19, 2010 and whose teachings are incorporated in this document by reference thereto.

FIELD OF THE INVENTION

The present invention relates, in general, to air filter cleaning devices and, more particularly, this invention relates to an apparatus for cleaning, by way of compressed air, air filters which are used in internal combustion engines on heavy off-road and over the road vehicles.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

As is generally well known, air filters are used extensively to prevent particulate impurities such as dust and dirt from entering into the combustion chambers of engines. A typical air filter is annular in construction and has a filtering medium which is incorporated into the cylindrical side wall and which allows for passage of air but traps the particulates on its outer surface. When the particulate build-up becomes significant, the air flow through the filtering medium is restricted causing abnormal operation of the combustion engine that increases operating costs, decrease engine performance, decrease engine efficiency and may potentially result in engine failure.

On passenger-type vehicles, it takes a relatively long period of time for the air filter to accumulate significant amount of particulate which will restrict air flow and, therefore, these air filters are replaced relatively infrequently.

On heavy off-road and over the road vehicles, it is common for air filters to accumulate undesirable amount of particulate in a matter of days. Thus, these air filters need frequent attention to maintain the required air flow. However, air filter replacement is usually prohibitive due to cost of the new air filter requiring the operators of such vehicles to periodically clean air filters. One cleaning method is to repeatedly strike the air filter against a rigid structure to dislodge the particulate. However, it has been found that such method does not remove all accumulated particulate. Another method involves use of an air hose with the nozzle inserted into the inner aperture or cavity of the air filter. However, the air is discharged through the nozzle at higher than desirable pressure capable of damaging the filtering medium and requires greater than desirable effort and concentration by the operator to adequately clean the air filter without damaging filtering medium.

Prior to the instant invention, efforts have been made to alleviate difficulties in cleaning air filters.

U.S. Pat. No. 5,078,763 issued to Blount-Gillette discloses one type of a portable air filter cleaning device that includes a bottom plate member having a flat upper surface, an apertured vertical column connected to a high pressure air hose and fixed to the bottom member, and a top plate member, removable from the vertical column, having a flat bottom surface, where an annular filter is placed around the vertical column and top plate member is placed onto the vertical column, sealing the filter between the top plate member and the bottom plate member. Air is then forced into the vertical column, exiting through the apertures and through the filter itself, forcing any accumulated particles off the surface of the filter.

U.S. Pat. No. 3,958,296 issued to Fell discloses another type of the portable filter cleaning device that includes a housing and an upper member. The air filter to be cleaned is inserted between the housing and the upper member. The upper member is provided with a vertically depending rotatable pipe means provided with radially directed nozzles. The pipe means is also provided with a pair of nozzles directed at an angle to the radial to provide a rotary movement to the pipe means. The air filter cleaner may be operated from air compressors readily available on the job site, such as compressors on the heavy construction equipment itself.

In U.S. Pat. No. 6,588,057, McMahon discloses yet another type of the portable air filter cleaning device that includes an elongated, readily grippable handle having a through bore and a connector at one end for coupling to an air supply hose, and a rotary head is rotatably mounted on the other end of the handle. The rotary head has an internal air distribution chamber with small outlet openings in its outer peripheral wall for spraying air from the chamber. Rotor outlet passageways in the peripheral wall are arranged at an angle to cause the head to spin in a turbine-like fashion when air flow is directed from the chamber and out through the passageways. The rotating head sprays air outwardly across the surface of an air filter unit to dislodge dirt from filter paper in a filter unit.

U.S. Pat. No. 7,815,701 issued to Applicant of this application provides a conically shaped member that seals one end of the filter and includes an induction chamber so as to rotate the elongated shaft having orifices disposed along the length thereof.

However, there is a further need for an improved apparatus for cleaning air filters of various lengths and diameters particularly at low air pressure supply.

SUMMARY OF THE INVENTION

According to one aspect, the invention provides an apparatus for cleaning air filters. The present invention utilizes a pressurized fluid flow, preferably air, to rotate a set of air spraying jets inside an aperture or cavity of a filter in order to remove particles from the filter. To ensure proper positioning of the jets in relation to the filter the instant invention uses a set of plates with slots and centering pins, wherein the pins position and center the apparatus on one end of the filter. The set of plates also at least partially blocks the flow of air out of the ends to more efficiently direct the flow of air from the jets to the filter. The jets may be then moved or reciprocated along the length of the filter for cleaning purposes.

OBJECTS OF THE INVENTION

It is, therefore, one of the primary objects of the present invention to provide a portable apparatus for cleaning air filters with a pressurized fluid flow.

Another object of the present invention to provide a portable apparatus for cleaning air filters with compressed air.

Another object of the present invention is to provide an apparatus for cleaning air filters which are used in internal combustion engines on heavy off-road and over the road vehicles.

Yet another object of the present invention is to provide an air filter cleaning apparatus which is suitable for use with air filters of different lengths.

A further object of the present invention is to provide an air filter cleaning apparatus which is suitable for use with air filters of various diameters.

Yet a further object of the present invention is to provide an air filter cleaning apparatus that can be used with low air pressure.

Yet still another object of the present invention is to provide an air filter cleaning apparatus with a filter mounting member capable of securing and centering filters of various lengths and diameters to said mounting member.

Yet still another object of the present invention is to provide an air filter cleaning apparatus with a filter mounting member capable of securing and centering filters of various lengths and diameters to said mounting member, comprising a first plate with a set of substantially straight slots radiating out from a first center aperture, a second plate with a set of curved slots radiating out from a second center aperture and a set of pins for centering a filter.

An additional object of the present invention is to provide an air filter cleaning apparatus which includes a rotating hollow member having a plurality of ports to direct supplied air pressure to the inner surface of the filtering medium.

Another object of the present invention is to provide an air filter cleaning apparatus which includes a rotating hollow member having an irregularly shaped interior for a plurality of apertures to direct supplied air pressure to the inner surface of the filtering medium.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

Reference is now made to FIGS. 1-8, wherein there is shown an apparatus, generally designated as 10. The apparatus 10 is shown and described in use for cleaning an air filter 2 which is generally employed in internal combustion engines on heavy off-road or over the road vehicles which are not shown but well known in the art. Briefly, such air filter 2 has a tubular, sleeve-like shape with a hollow interior 4. A filtering medium 6 is mounted intermediate ends of the air filter 2 and has interior surface 8 and exterior surface 9. However, it is within the scope of the invention to use the apparatus 10 for any other hollow air filters having at least one open end.

Figure 3:
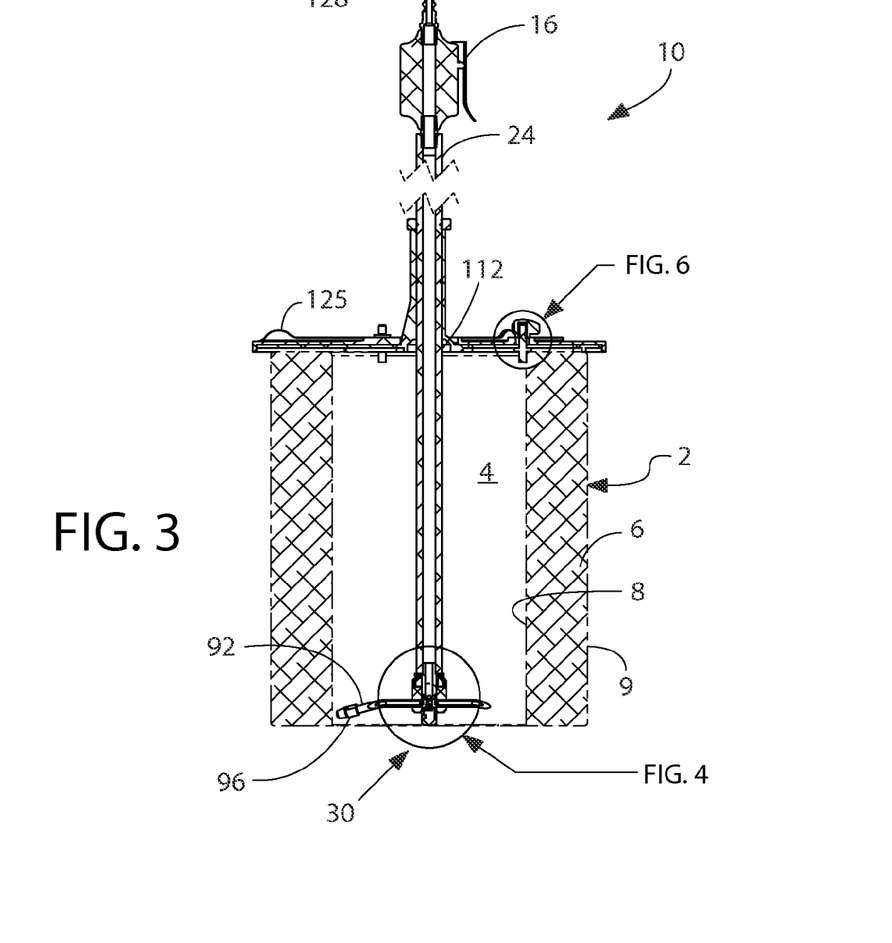
FIG. 3 is a cross-sectional elevation view of the apparatus of FIG. 1 along lines III-III of FIG. 2.

One essential element of the apparatus 10 is a member 20 having a hollow interior 22 and adapted for communicating a flow of pressurized fluid therethrough. Preferably, such member 20 is an elongated rigid tubular member manufactured from lightweight material, such as aluminum. The member 20 defines a longitudinal axis 12 of the apparatus 10 and has a pair of ends 24 and 26 spaced apart from each other along the longitudinal axis 12. During operation, one end of the elongated member 20, referenced with numeral 24 in FIG. 3 is connected to a source of fluid under pressure (not shown), preferably regulated by a conventional trigger 16 attached to the member 20 with a threaded member 18 or any other devices operable to selectively supply and discontinue supply of the fluid under pressure. Preferably, such fluid under pressure is compressed air. Although the member 20 may be of a flexible type, such as a hose, it is presently preferred for the reasons to be explained later to manufacture such member 20 from a substantially rigid material. Therefore, in the remaining portion of this document, the member 20 will be referred to as a first elongated rigid member 20.

Figure 4:
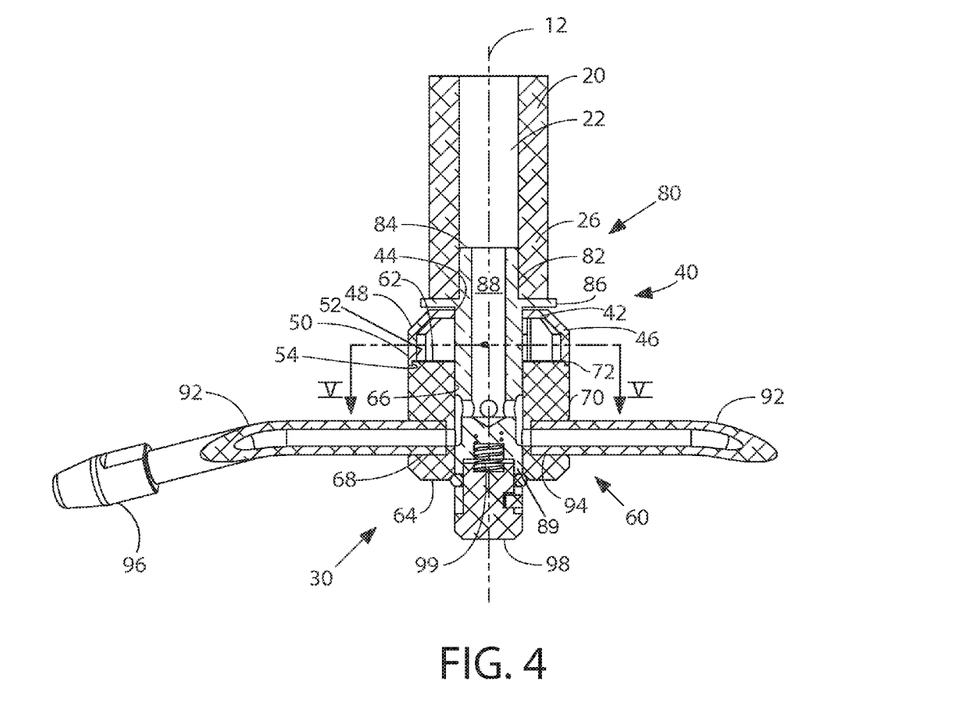
FIG. 4 is an enlarged cross-sectional view of the apparatus of FIG. 3.
Figure 5:
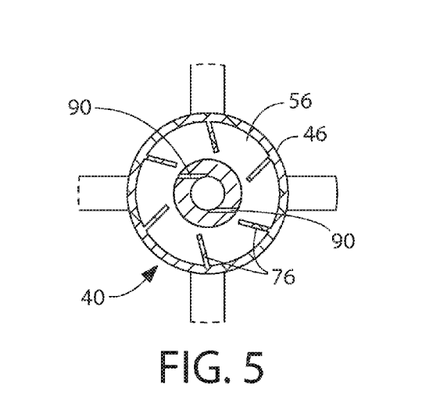
FIG. 5 is a cross-sectional planar view of the apparatus along lines V-V of FIG. 4, particularly illustrating the interior geometries of the body and bearing shaft.

Another essential element of the apparatus 10 is a body, generally designated as 30. The body 30 is disposed at an axially opposite end of the member 20, referenced with numeral 26 in FIG. 4. The body 30 is best shown in FIG. 4 as being comprised of two body portion. The first body portion, generally designated as 40, is disposed at the axially opposite end 26 of the first elongated rigid member 20. The first body portion 40 includes a base 42 having a pair of spaced apart generally planar surfaces defining thickness of the base 42 and being disposed generally normal to the longitudinal axis 12 of the apparatus 10. A central aperture 44 is formed through the thickness of the base 42. There is also a peripheral wall 46 that depends from the base 42. The peripheral wall 46 has a frustoconical wall portion 48 disposed next to the base 42 and a generally cylindrical wall portion 50 extending from the frustoconical wall portion 48. A first peripheral notch 54 is formed on an inner surface 52 of the generally cylindrical wall portion 50 adjacent distal end of the peripheral wall 46. The base 42 and the peripheral wall 46 define in combination a hollow interior 56 of the first body portion 40.

The second body portion, generally designated as 60, is disposed axially with the first body portion 40. The second body portion 60 includes a pair of axial ends 62 and 64 spaced apart along the longitudinal axis 12 and defining length of the second body portion 60. A first axial bore 66 is formed through the length of the second body portion 60 and is provided in fluid communication with a hollow interior 22 of the first elongated member 20. At least one and, preferably, a plurality of ports 68 are formed through a wall thickness of the second body portion 60 and are disposed in a radial spaced-apart pattern in a plane being normal to the longitudinal axis 12. The at least one port 68 is provided in fluid communication with the first axial bore 66 and communicates pressurized fluid flow external to the second body portion 60 when the pressurized fluid flows through the hollow interior 22. There is also a second peripheral notch 72 being disposed on an outer surface 70 of the second body portion 60 adjacent the axial end 62 thereof being disposed adjacent the distal end of the peripheral wall 46 of the first body portion 40. The second peripheral notch 72 is sized to operatively mate with the first peripheral notch 54 so as to rigidly and sealingly secure the second body portion 60 to the first body portion 40, for example by way of a adhesive (not shown) or any other conventional means. Although the body 30 has been illustrated in FIG. 4 as being manufactured from separate first body portion 40 and second body portion 60, the instant invention contemplates that such body 30 can be manufactured as a single-piece unitary member. In either form, the body 30 is preferably manufactured from a plastic material and, more particularly, from engineered thermoplastic material, for example such as material manufactured by E.I. DuPont de Nemours & Co. of Wilmington, Del. under the general Delrin brand.

Advantageously, the hollow interior 56 defines a closed chamber when the first body portion 40 is rigidly and sealingly secured to the second body portion 60. For the reasons to be explained later, the apparatus 10 further includes a plurality of baffles 76 disposed in the closed chamber 56 and securely attached to at least one of the inner surface of the peripheral wall 46 of the first body portion 40 and a surface of the axial end 62 of the second body portion 60. It is presently preferred that the at least one port 68 is disposed independent to the closed chamber 56 so as to enable proper rotation of the body 30. Independent means herein that the at least one port 68 is disposed outside or external of the closed chamber 56 but within body 30.

A second elongated member, generally designated as 80, is provided so as to operatively mount the body 30 at the axial end 26 of the first elongated member 20. The second elongated member 80 includes a peripheral surface 82 being so sized that a first axial end 84 of the second elongated member 80 is rigidly secured within the hollow interior 22 of the first elongated member 20. A radial generally planar flange 86 upstands on the peripheral surface 82 of the second elongated member 80 and has one surface thereof positioned in direct contact with the axially opposite end 26 of the first elongated rigid member 20. A second axial bore 88 is formed through a length of the second elongated member 80 in fluid communication with the hollow interior 22 of the first elongated member 20 and each of the plurality of ports 68. Thus, the second elongated member 80 is also a generally hollow member. At least one and preferably a pair of orifices 90 are formed through a wall of the second elongated member 80 generally normal to the longitudinal axis 12 and in fluid communication with the second axial bore 88 and the closed chamber 56. Each of the pair of orifices 90 is disposed at an angle to surfaces of the plurality of baffles 76 so as to direct the pressurized fluid flow at least onto the surfaces of the plurality of baffles 76. Furthermore, the central aperture 44 of the first body portion 40 and the first axial bore 68 of the second body portion 60 are being so sized that the first and second body portions, 40 and 60 respectively, rotate on the peripheral surface 82 of the second elongated member 80 when the pressurized fluid flow is communicated through the hollow interior 22 of the first elongated member 20. Thus, the baffles 76 and orifices 90 essentially provide means for rotating the body 30 on the second elongated member 80 upon supply of pressurized fluid flow. Preferably, the second elongated member 80 is manufactured from a friction reducing material, for example such as brass, so as to provide a bearing-like surface and facilitate the rotation of the body 30. Although it is also contemplated to manufacture the second elongated member 80 from other materials and either coat its peripheral surface 82 with friction reducing materials or mount a bearing bushing (not shown) on the peripheral surface 82.

To facilitate cleaning of the filtering medium 6, there is provided at least one and preferably a plurality of optional elongated nozzles 92, each of the plurality of elongated nozzles 92 having a proximal end 94 thereof detachably attached in fluid communication to a respective one of the plurality of ports 68 and having a distal end 96 thereof extending a predetermined distance from the outer surface of the second body portion 60 so as to communicate the pressurized fluid flow external thereto and onto the interior surface 8 of the filtering medium 6. The nozzles 92 are so dimensioned that the distal end 96 is positioned in close proximity to the interior surface 8 of the filtering medium 6 of the filter 2.

Finally, a lock fitting 98 is detachably attached to an axially opposed end 89 of the second elongated member 80 so as to operatively retain the body 30 for rotation on the peripheral surface 82 of the second elongated member 80 and substantially seal the first axial bore 66 of the second body portion 60. Such lock fitting may be a conventional quarter-turn fastener aided in operation by a spring 99. Lock fitting 98 also facilitates change-over of the body 30 and nozzles 92 either for cleaning purposes of the chamber 56, nozzles 92 and/or the second elongated member 80 or to install a new body 30 with different nozzles 92 so as to better adapt the apparatus 10 to a particular design of the filter 2.

In operation, the individual tasked with cleaning the filter 2 may simply grasp the exterior surface of the first elongated member 20 so as to move the body 30 in a reciprocal linear direction within the hollow interior 4 of the filter 2. When the filter 2 is not elongated, as often found in passenger-type vehicles, the user can simply insert the body 30 into the opening of such filter with only minimal linear movement or no movement at all and withdraw the body 30 after cleaning cycle is completed.

The above-described apparatus 10, and more particularly, the use of the body 30 and nozzles 92, have been found advantageous in cleaning most air filters presently in use with air pressure of about sixty (60) pounds per square inch (PSI). At such supply air pressure, it has been found advantageous to provide nozzles with an internal diameter in the range between about 0.06 inches and about 0.125 inches.

While the user may effectively clean the elongated filter 2 by simply moving the body 30 in the reciprocal linear direction, the instant invention contemplates means, generally designated as 100, for mounting the first elongated member 20 and the body 30 on one end of the filter 2 so as to aid and facilitate reciprocal linear movement thereof.

Figure 1:
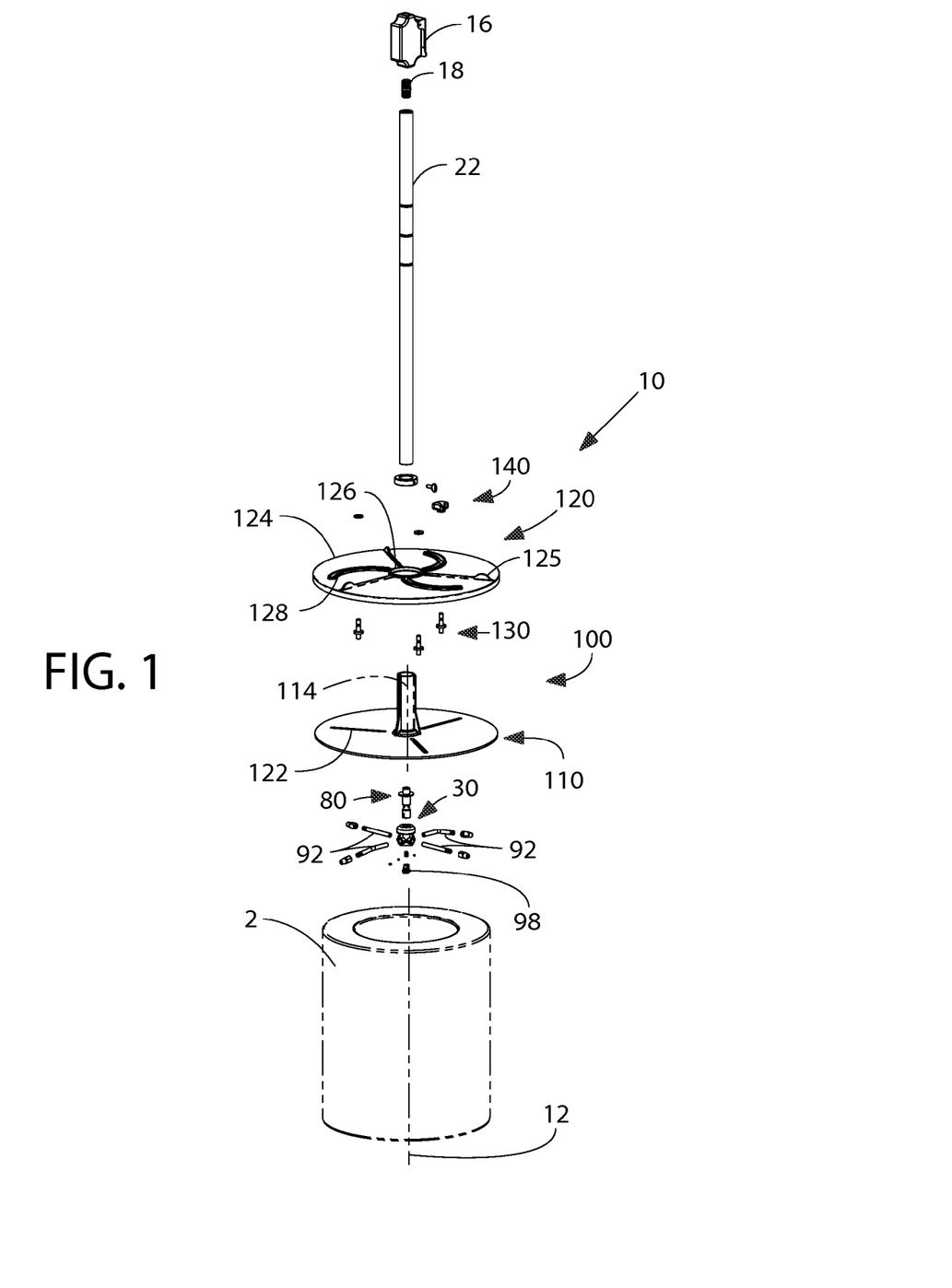
FIG. 1 is an exploded view of an apparatus of the present invention for cleaning air filters.
Figure 2:
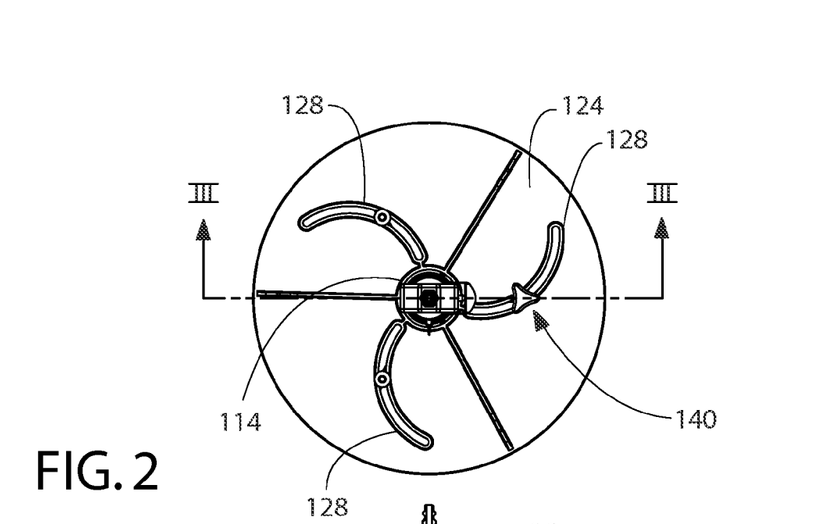
FIG. 2 is a top view of the apparatus of FIG. 1.

By way of an example of FIGS. 1-3, such mounting means 100 comprises a first mounting member 110 that includes a pair of generally planar surfaces positioned normal to the longitudinal axis 12 and spaced apart to define thickness of the first mounting member 110. A central aperture 112 is formed through the thickness of the first mounting member 110. A cylindrical sleeve 114 is secured to and upstands on one of the pair of generally planar surfaces of the first mounting member 110. The cylindrical sleeve 114 has a hollow interior 116 axially aligned with the central aperture 112 formed through the thickness of the first mounting member 110 and is being sized to receive an exterior surface of the first elongated member 20 in a manner wherein the first elongated member 20 is mounted for a reciprocal sliding movement along the longitudinal axis 12. In use, one surface of the mounting member 110 is rested on one end of the filter 2 and the first elongated member 20 is simply moved, manually, in the reciprocal linear direction within the sleeve 114. The first mounting member 110 is also advantageous for closing one end of the filter 2 so as to improve the cleaning process, although it is not necessary in the instant invention to seal the one end of the filter 2.

In the most presently preferred embodiment, the instant invention provides means, generally designated as 120, for centering the first elongated member 20 and the body 30 on one end of filter 2. As best shown in FIGS. 1-2 and 6-7, such means 120 includes a plurality of generally straight slots 122 formed in a spaced apart radial pattern through the thickness of the first mounting member 110 and radiating from the longitudinal axis 12. The means 120 further includes a second mounting member 124 that has a pair of generally planar surfaces positioned normal to the longitudinal axis 12 and spaced apart to define thickness of the second mounting member 124. Preferably, one surface of the second mounting member 124 is positioned in a direct, surface-to-surface, contact with one surface of the first mounting member 110. A central aperture 126 is formed through the thickness of the second mounting member 124 and is sized so as to pass an exterior surface of the cylindrical sleeve 114 therethrough. A plurality of curved slots 128 are formed in a spaced apart radial pattern through the thickness of the second mounting member 124 in alignment with the plurality of generally straight slots 122. A width of each of the plurality of curved slots 128 may be greater than a width of each of the plurality of generally straight slots 122.

Figure 6:
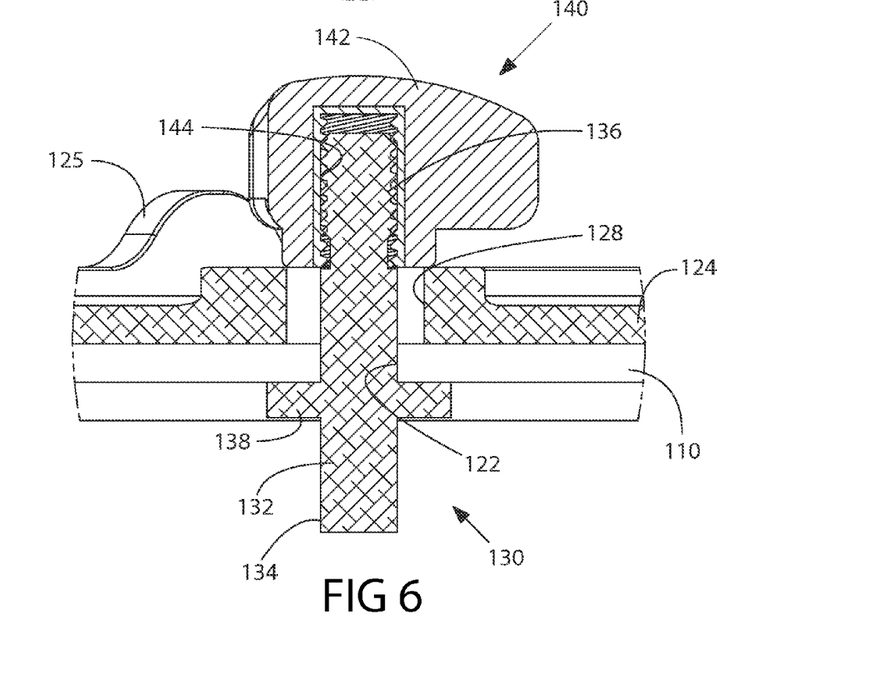
FIG. 6 is an enlarged cross-sectional view of a mechanism for centering air filter along shown in FIG. 3.
Figure 7:
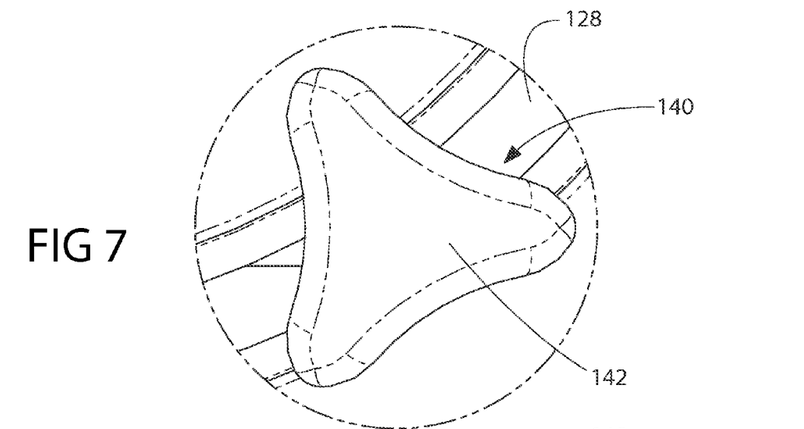
FIG. 7 is a partial top view of the centering mechanism of FIG. 6.

Furthermore, there is a plurality of centering members, generally designated as 130, best shown in FIGS. 1 and 6. Each of the plurality of centering members 130 passes through a pair of respectively aligned generally straight and curved slots, 122 and 128 respectively. Each centering member 130 includes an elongated generally round rigid body 132 having a pair of axially opposite ends and having a peripheral surface sized so as to be passed through the respective generally straight slot 122. A thread 136 is formed on an exterior surface 134 of the generally round rigid body 132 adjacent one axial end thereof. A peripheral flange 138 may be disposed on the peripheral surface 134 of the generally round rigid body 132 mediate the axial ends thereof and generally normal to the longitudinal axis 12. In operation, rotation of the second mounting member 124 relative to the first mounting member 110 causes selective linear movement of the plurality of centering members 130 radially toward to and away from the longitudinal axis 12 as directed by the curved slots 128 and guided by the straight slots 122. Thus, the exterior surface 134 of each centering member 130 adjacent a bottom end thereof is positioned in direct contact with the inner surface 8 of the filtering medium 6 of the filter 2. To facilitate rotation, the second mounting member 124 is adapted with at least one grip member 125 disposed on the surface thereof. Advantageously, the generally straight slots 122 and generally curved slots 128 cause substantially identical movement of all centering members 130 in the radial direction.

In order to temporarily fix such adjusted position of the centering members 130, the instant invention provides a plurality of locking fasteners 140, each of the plurality of locking fasteners 140 including a rigid body 142, a threaded bore 144 formed in one end of the rigid body 142 of the each of the plurality of locking fasteners 140 and sized to operatively mate with the thread 136 on the centering member 130. In operation, a rotation of the locking fastener 140 in one direction applies a clamping force to clamp thicknesses of the first and second mounting members, 110 and 124 respectively between one surface of the peripheral flange 138 of the centering member 130 and an end of the rigid body 142 of the locking fastener 140. Rotation of the locking fastener 140 in the opposite direction releases the clamping force and allows radial movement of the respective centering member 130.

Thus, a method for cleaning a tubular sleeve-shaped air filter 2 includes the step of providing an apparatus 10. Then, positioning the body 30 of the apparatus 10 within a hollow interior 4 of the air filter 2, preferably at one end thereof. Next, connecting the first elongated member 20 of the apparatus 10 to a source of pressurized fluid flow (not shown). Delivering the pressurized fluid flow, by way of ports 68 in the body 20 to an internal surface 8 of the sleeve-shaped air filtering medium 6. Finally, moving the body 30, preferably by way of the first elongated member 20, in a reciprocal motion axially along a length of the air filter 2. The most presently preferred method includes the step of providing at least one mounting member 110 with a sleeve 114 and inserting the first elongated member 20 into the sleeve 114 prior to moving the body 30 in the axial direction.

The instant invention also contemplates that the apparatus 10 can be adapted with powered means for selectively enacting a linear reciprocal movement of the first elongated member 20 and the body 30.

Figure 8:
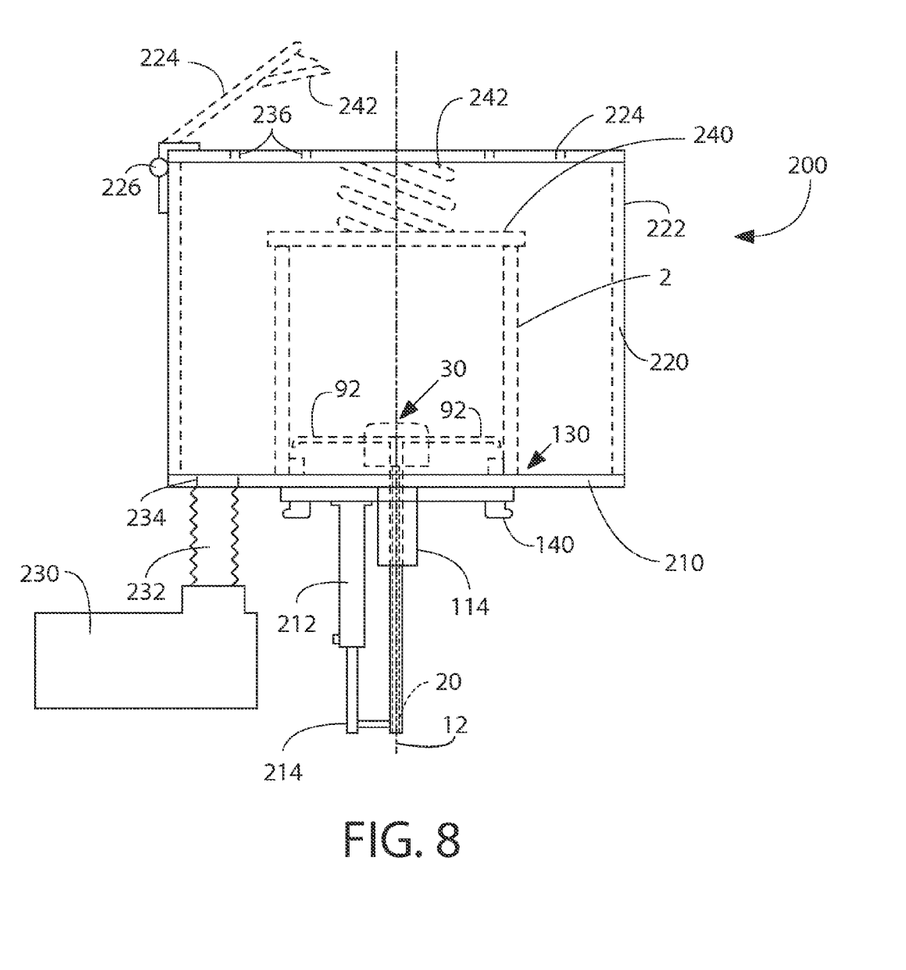
FIG. 8 is a planar elevation view of the apparatus of FIG. 1 mounted within an enclosure and connected to a powered device for enacting linear motion.

In further reference to FIG. 8, such powered means, generally designated as 200, includes a base 210 that is mounted in stationary position, preferably in a generally horizontal plane. There is also means for mounting the first elongated member 20 and the body 30 for the reciprocal linear movement. Such mounting means may include the above-described sleeve 114 added to the base 210. Advantageously, the second mounting member 224 with the centering members 130 and locking members 140 may be employed in this embodiment in combination with the base 210, which additionally is adapted to function as the above-described first mounting member 110. The powered means 200 further includes means connected to the first elongated member 20 for enacting the reciprocal linear movement thereof. Such linear movement enacting means may include a cylinder 212 having a movable portion 214 thereof connected to the first elongated member 20, wherein the movable portion 214 moves linearly when commanded. It would be advantageous to connect such cylinder 212 to the same source of compressed air (not shown), although a hydraulic cylinder can be employed in the instant invention. Furthermore, any powered devices capable of generating linear motion can be employed herewithin.

The instant invention also contemplates enclosing the filter 2 during cleaning process. Accordingly, a generally closed hollow enclosure 220 is provided and is mounted in a depending manner on the base 210, wherein at least the body 30 is disposed within the enclosure 220 during cleaning of the filter 2. The enclosure 220 includes four peripheral walls 222 and an end wall 224. The end wall 224 may be adapted with a hinge 226 for pivotal connection to one of the four peripheral walls 222 so as to provide means for accessing the interior of the enclosure 220. Alternatively, one of the side walls 222 may be hinged or may be adapted with a hinged door (not shown).

In combination with enclosure 220, it is contemplated to provide means for generating suction within the hollow enclosure 220. Such suction generating means may be a conventional vacuum cleaner 230 connected with the hose 232 to an aperture 234 in the base 210 with vent apertures 236 provided in the hollow enclosure 220. Or the hose 232 may be connected to a central vacuuming system (not shown) that may be available in the locations designated for cleaning the filter 2.

It has been also found advantageous to provide means for releasably securing the air filter 2 positioned on the base 210 during cleaning process. By way of an example only of FIG. 8, such releasably securing means may include a plate 240 positioned in contact with one end of the filter 2 and a biasing resilient member 242 having one end thereof attached to one surface of the plate 240 and having an opposite end attached to an inner surface of the hollow enclosure 220. During cleaning, the biasing resilient member 242 is sized to apply holding pressure to the filter 2 so as to prevent its radial movement, particularly when the centering members 130 are not employed.

Although the centering means have been illustrated to include a pair of plate shaped mounting members 110 and 124 with the generally straight slots 122 and generally curved slots 128, it is also contemplated that the second mounting member 124 may be replaced with a resilient biasing mean, such as springs (not shown) aligned with generally straight slots 122 and biasing the centering members 130 outwardly toward the peripheral edge of the mounting member 110, so that the centering members 130 move toward the longitudinal axis 12 when inserted into the hollow interior of the filter 2 in contact with the interior surface 8 thereof and, at the same time, applying pressure onto the interior surface 8.

Furthermore, the thread-based locking fasteners 140 may be replaced with a lever and cam-type clamping assembly attached to one end of the centering member 130.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A method for cleaning a tubular air filtering member, said method comprising the steps of:
    (a) providing an apparatus comprising a member having a hollow interior communicating a pressurized fluid flow, a body mounted for a rotation at one end of said member and having a hollow interior disposed in a fluid communication with said hollow interior of said member, and nozzles attached to said body in said fluid communication with said hollow interior thereof;
    (b) positioning at least said body and said nozzles of said apparatus within a hollow interior of said tubular air filtering member;
    (c) connecting said member of said apparatus to a source of pressurized fluid flow;
    (d) delivering said pressurized fluid flow, by way of said nozzles, to an internal surface of said tubular air filtering member; and
    (e) moving said body and said nozzles, by way of said member, along a length of said tubular air filtering member during delivery of said pressurized fluid flow.

2. The method of claim 1, wherein said step (a) further comprises the steps of:
    (a) providing a closed chamber within said body, said chamber having an irregular inner surface;
    (b) providing a second member having a hollow interior;
    (c) securing one end of said second member to said one end of said member so that said hollow interior of said second member is in said fluid communication with each of said hollow interior of said body, said hollow interior of said member and said nozzles;
    (d) mounting said body for said rotation on a peripheral surface of said second member;
    (e) extending said second member through said chamber; and
    (f) forming at least one orifice through a wall of said second member so as to direct said pressurized fluid flow onto said irregular inner surface.

3. The method of claim 1, further comprising the step of centering said member and said body on one end of said tubular filtering member.

4. The method of claim 3, further comprising the step of accommodating tubular filtering members of various diameters.

5. The method of claim 4, wherein said step of accommodating said tubular filtering members of various diameters includes the step of providing a mounting member having a center aperture formed through a thickness thereof, the step of providing means to center said mounting member on one end of said filtering member, the step of positioning and centering said mounting member on one end of said tubular filtering member and the step of inserting said member into said center aperture of said mounting member.

6. The method of claim 1, wherein step (a) includes the step of rotating said body about a longitudinal axis of said member.

7. The method of claim 1, wherein step (a) includes the step of providing four nozzles radially spaced with each other.

8. The method of claim 7, further providing said four nozzles as elongated tubular members.

9. The method of claim 8, further comprising the step of forming a bend in at least one tubular member.

10. The method of claim 1, further comprising the step of attaching a trigger device to said member at another end thereof, said trigger device being configured to selectively allow and terminate said pressurized fluid flow to said hollow interior of said member.

11. The method of claim 1, further comprising the step of connecting a powered means to said member for selectively enacting said movement of said member, said body and said nozzles along said length of said tubular air filtering member during said delivery of said pressurized fluid flow.

12. The method of claim 1, further comprising the step of releasably securing said tubular filtering member on a base.

13. The method of claim 12, further including the step of positioning a plate in a contact with one end of said filtering member, a step of attaching one end of a resilient biasing member to one surface of said plate and the step of attaching an opposite end of said resilient biasing member to a structure associated with said base.

14. The method of claim 1, further comprising the step of enclosing said tubular filtering member within a hollow enclosure.

15. The method of claim 14, further comprising the step of generating a suction within said hollow enclosure during said delivery of said pressurized fluid flow onto said internal surface of said tubular filtering member.

16. The method of claim 14, further comprising the step of attaching a powered means to said enclosure, the step of connecting said powered means to said member and the step of selectively enacting a linear movement of said member, said body and said nozzles along said length of said tubular air filtering member during said delivery of said pressurized fluid flow.

17. A method for cleaning a tubular air filtering member, said method comprising the steps of:
(a) providing a member having a hollow interior;
(b) mounting one or more elongated nozzles, in a fluid communication with said hollow interior, at one end of said member for a rotation thereabout and in a plane normal to a length of said member;
(c) providing a mounting member having an aperture formed through a thickness thereof;
(d) inserting said member into said aperture;
(e) positioning said one or more nozzles within a hollow interior of said tubular air filtering member;
(f) directing said one or more elongated nozzles onto an internal surface of said tubular air filtering member;
(g) closing, with one surface of said mounting member, one end of said tubular air filtering member;
(h) delivering said pressurized fluid flow, through said hollow interior and through said one or more elongated nozzles, onto an internal surface of said tubular air filtering member; and
(i) moving said member and said one or more elongated nozzles along a length of said tubular air filtering member during a delivery of said pressurized fluid flow onto said internal surface in step (h).

18. The method of claim 17, wherein the step (c) includes the step of providing a hollow sleeve in an axial alignment with said aperture and wherein said method further includes the step of inserting said member into said hollow sleeve.

19. The method of claim 17, wherein said method further comprises the step centering said member along a longitudinal axis of said tubular air filtering member.

20. The method of claim 19, wherein the step of centering said member includes the step of extending surface portions from said one surface of said mounting member and the step of positioning said surface portions against said internal surface of said tubular air filtering member.

21. The method of claim 17, wherein the step (h) includes the step of connecting said hollow interior of said member to a source of pressurized fluid flow.

* * * * *